United States Patent
Porikli (10) Patent No.: US 8,405,540 B2
(45) Date of Patent: Mar. 26, 2013

(54) METHOD FOR DETECTING SMALL TARGETS IN RADAR IMAGES USING NEEDLE BASED HYPOTHESES VERIFICATION

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 172 days.

(21) Appl. No.: 12/753,643

(22) Filed: Apr. 2, 2010

(65) Prior Publication Data
US 2011/0241927 A1    Oct. 6, 2011

(51) Int. Cl.
G01S 13/66    (2006.01)
G01S 13/06    (2006.01)
G01S 13/89    (2006.01)
G01S 13/00    (2006.01)

(52) U.S. Cl. .............. 342/90; 342/89; 342/91; 342/94; 342/175; 342/176; 342/179; 342/195; 382/100; 382/103

(58) Field of Classification Search .......... 342/21, 342/22, 25 R–25 F, 27, 28, 89–103, 159–164, 342/175, 176, 179, 192–197; 382/100, 103
See application file for complete search history.

(56) References Cited

U.S. PATENT DOCUMENTS

| | | | | |
|---|---|---|---|---|
| 5,552,787 A | * | 9/1996 | Schuler et al. | 342/25 A |
| 5,767,679 A | * | 6/1998 | Schroder | 342/22 |
| 5,856,803 A | * | 1/1999 | Pevler | 342/90 |
| 6,466,156 B1 | * | 10/2002 | Ulander | 342/25 R |
| 6,888,493 B2 | * | 5/2005 | Driessen et al. | 342/91 |
| 7,701,383 B2 | * | 4/2010 | Blumling | 342/89 |
| 8,094,060 B2 | * | 1/2012 | Beard et al. | 342/91 |
| 2004/0027274 A1 | * | 2/2004 | Driessen et al. | 342/91 |
| 2006/0132354 A1 | * | 6/2006 | Beard et al. | 342/160 |

* cited by examiner

Primary Examiner — Bernarr Gregory
(74) Attorney, Agent, or Firm — Gene Vinokur; Dirk Brinkman (57) ABSTRACT

A method detects a target in a sequence of radar images, wherein each image is partitioned into a grid of cells, and wherein each cell has a corresponding position in an image coordinate system associated with a location in a world coordinate system. For each most recent image in a sliding temporal window of images, intensities of each cell are determined, and the subset of the cells having highest intensities is stored as a set of current needles. A set of hypotheses, obtained by using a state transition model and corresponding maximum limits, is determined for the current set of needles and appended to a set of queues. The hypotheses for the previous sets of needles to the corresponding set of queues are updated, and a maximum likelihood in the set of queues are selected to detect the location of targets.

17 Claims, 6 Drawing Sheets

METHOD FOR DETECTING SMALL TARGETS IN RADAR IMAGES USING NEEDLE BASED HYPOTHESES VERIFICATION

FIELD OF THE INVENTION

This invention relates generally to detecting targets in radar images, and more particularly to detecting very small targets using sample based track-before-detection.

BACKGROUND OF THE INVENTION

In high-end radar systems, the reflected signals from radar emission are amplified, and then filtered to extract a sequence of 2D input image in the form of cells in an image coordinate system. In radar terminology the cells correspond to pixels in conventional images. Each cell corresponds to an intensity (power) of the received signal in a particular spatial location in world coordinate system, defined by a range (bins) and an azimuth (beams). In other words, the coordinates of the cells in the image coordinate system correspond to locations in the world coordinate system.

In addition to a potential target reflection signal, the image also includes noise, electromagnetic interference, and clutter. It is extremely difficult to detect very small targets in noisy environments. The difficulty can be compared to the classical "finding the needle in the haystack problem."

Most simple methods apply a threshold to the input image and label the cells exceeding the threshold value as corresponding to candidate targets. If the threshold is too low, then more targets are detected, at the expense of an increased numbers of false alarms. Conversely, if the threshold is relatively large, then fewer targets are detected, but the number of false alarms is relatively small.

Often the threshold is set to achieve a constant false alarm rate (CFAR) by adaptively estimating the level of the noise floor around the cell using background statistics. This is acceptable as long as the signal-to-noise (SNR) and signal-to-clutter (SCR) ratios are sufficiently large. However, for a lower SNR, where targets cannot be easily distinguished from the cluttered noisy background, such cell thresholding approaches give large rates of false detections.

Figure 1:
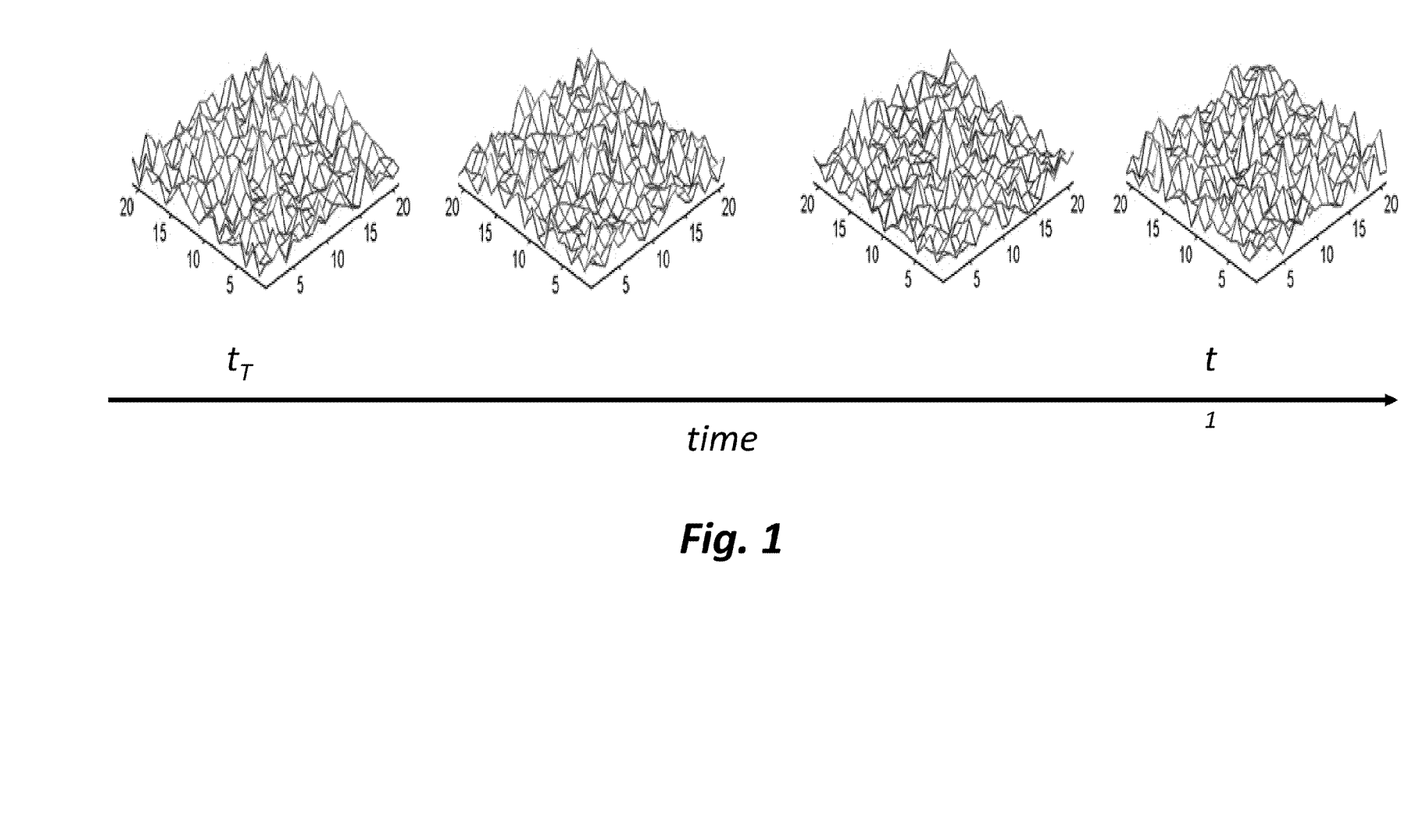
FIG. 1 is a sequence of images, in a form of cells, acquired from a radar system in which the method according to embodiments of the invention detects very small targets.

FIG. 1 illustrates the problem solved by the invention. FIG. 1 has a sequence of four images of radar measurements when SNR=20 dB and SCR=7 dB. The most recent image is a time $t_1$, and the earliest image is at $t_T$. There is a single target in the center of each image. Even for these small 21×21 cell images, the target signal cannot be easily identified. In real applications, the image size is 1000×100 cell, which means targets are even less distinguishable from the background noise and clutter.

Instead of making a decision solely based on the current image, detectors can be supplied with a temporal window of previous measurements to allow the detection of targets when the SNR is small. In the example shown, the temporal window includes the current and three previous images. Evidence of there being a target is accumulated by integrating likelihoods of individual cells over time in the temporal window. In other words, hypothetical targets are tracked before the targets are detected. This class of methods is often called track-before-detect (TBD).

Ideally, the evidence accumulation is performed by evaluating all possible states of a dynamic and intrinsic evolution of the target. Here the state of the target can correspond, for example, to the position and velocity of the target in the image and the intensity of the underlying cell. For simplicity, the state evolution is usually modeled by a linear process, especially when the temporal window duration is short. However, the input image is a stochastically sampled process and has only a nonlinear relation with the target state, albeit the target distribution characteristics are assumed to be available. In addition, cell responses with high intensities are only weakly correlated to the locations of the targets. As a result, an analytically intractable number of states can be generated for most basic specifications.

One way to make this problem feasible is to quantize the state space and use discrete valued target models. Several grid methods have been developed to estimate the evidence in discrete space including a Bayesian maximum a posteriori MAP estimator, a maximum likelihood (ML) estimator, or a statistical graph networks, e.g. hidden Markov models (HMM).

The Bayesian estimator is an approximation to the posterior distribution of the target state. On a uniformly spaced set of states, which is augmented with a null state to indicate the possibility of no target case, the estimator applies the Bayes rule by imposing certain heuristics on the state transition probability, and marginal likelihoods, e.g., the parameters of the probability of target existence and the probability of target discontinuation control the detection performance. The parameters can be adjusted to optimize a performance of the detector.

The selection of the quantization steps is a trade off between estimation accuracy, which improves with finer resolution, and computational requirements. The Bayesian estimator selects the state with a highest probability by recursively defining the probability of the target occupying a particular location by the superposition of all of the possible paths to that position. If the accumulated probability is higher than the null state probability, then a detected target is signaled.

Rather than accumulating the probability from alternate paths, the ML estimator selects the single best path. A quantized state space Viterbi process is designed to determine the most likely sequence of states by maximizing a joint posterior probability of the sequence of states. One advantage is that the Viterbi process always produces an estimate consistent with the dynamic model.

A discrete state space often leads to high computation and memory requirements. An alternative is to use a sequential analogue of a Markov chain Monte Carlo (MCMC) batch method, such as particle filter, to accumulate the evidence within the Bayesian framework. MCMS is a numerical approximation technique that uses randomly placed samples instead of fixed grid. The idea is to represent the required posterior density function by a set of random samples with associated weights, and to determine estimates based on these samples and weights.

As the number of samples becomes very large, this characterization becomes an equivalent representation to the usual functional description of the posterior probability density function (PDF), and the particle filter approaches the optimal Bayesian estimate. Although the particle filtering can achieve similar estimation performance for lower cost by using fewer sampling points than are required for a discrete grid, particle filtering usually requires a considerable amount of particles to effectively approximate continuous probabilistic distributions. Thus, the computational burden for high dimensional state spaces, e.g., where acceleration and non-linear motion are parameterized, becomes an issue.

Instead of using a numerical model for the target distribution, a multiple-hypothesis tracker (MHT) imposes a parametric representation to reduce the computational load. The MHT allows a hypothesis to be updated by more than one consecutive state at each update, generating multiple possible hypotheses. With each input image, all existing hypotheses are updated and unlikely hypothesis are deleted to upper bound the computational complexity.

A probabilistic MHT (PMHT) uses a recursive expectation maximization (EM), such as a Kalman filter, to determine, in an optimal way, associations between the measurements and targets, instead of measurement-to-hypothesis assignment. The probability that each measurement as associated with each hypothesis is estimated using the MAP method. In other words, the PMHT uses soft posterior probability associations between measurements and targets. These soft associations can be considered as mapping the problem from discrete, i.e., of combinatorial complexity, to continuous, i.e., amenable to iterative procedures.

In a histogram PMHT (H-PMHT), the received energy in each cell is quantized, and the resulting integer is treated as a count of the number of measurements that are within that cell. The sum over all of the cells is the total number of measurements taken. A probability mass function for these discrete measurements is modeled as a multinomial distribution, where the probability mass for each cell is the superposition of target and noise contributions.

Rather than using the entire input image, maximum likelihood joint probabilistic data association (JPDA) reduces the threshold to a low level, and then applies a grid-based state model for estimation to avoid track coalescence. Another approach to detect targets in the TBD manner is to apply a state parameter mapping, e.g., a Hough transform, after quantizing the parameters.

In addition to being computationally expensive, the above prior art methods assume the signal, clutter, and noise distribution functions to be known due to their dependency on the likelihood ratio function. Furthermore, those methods impose single-stage Markovian updates, as particle filters, for the determination of the cell likelihoods, even though a larger portion of the previous measurements is often available.

SUMMARY OF THE INVENTION

The embodiments of the invention provide a method for detecting small targets from a sequence of radar images using sample based track-before-detection (TBD). The TBD method is grid based and utilizes all available measurements in a given temporal window without imposing any assumptions on probability distributions.

It is an object of the invention to achieve at least a 50% true detection rate at only a $10^{-6}$ false alarm rate for the targets are smaller than the size of the cells, and an overall signal-to-noise and signal-to-clutter ratios are less than 7 dB. It is assumed that the number of targets is unknown. That is, the number of targets is estimated from the radar images.

The method selects a small subset of cells based on intensities of cells. For simplicity, the selected cells in the subset are called "needles." By picking a small number of needles, due to the mutually independent nature of individual cell measurements for targets smaller than the physical cell coverage, the method collects potential footprints of targets in each image.

Using state transition models, the method generates a set of hypotheses and aggregates the cell likelihoods along each hypothesis.

In a streaming mode, the needle selection only applies to the current image by updating the hypotheses for the needles in the temporal window.

DETAILED DESCRIPTION OF THE PREFERRED EMBODIMENTS

Figure 2A:
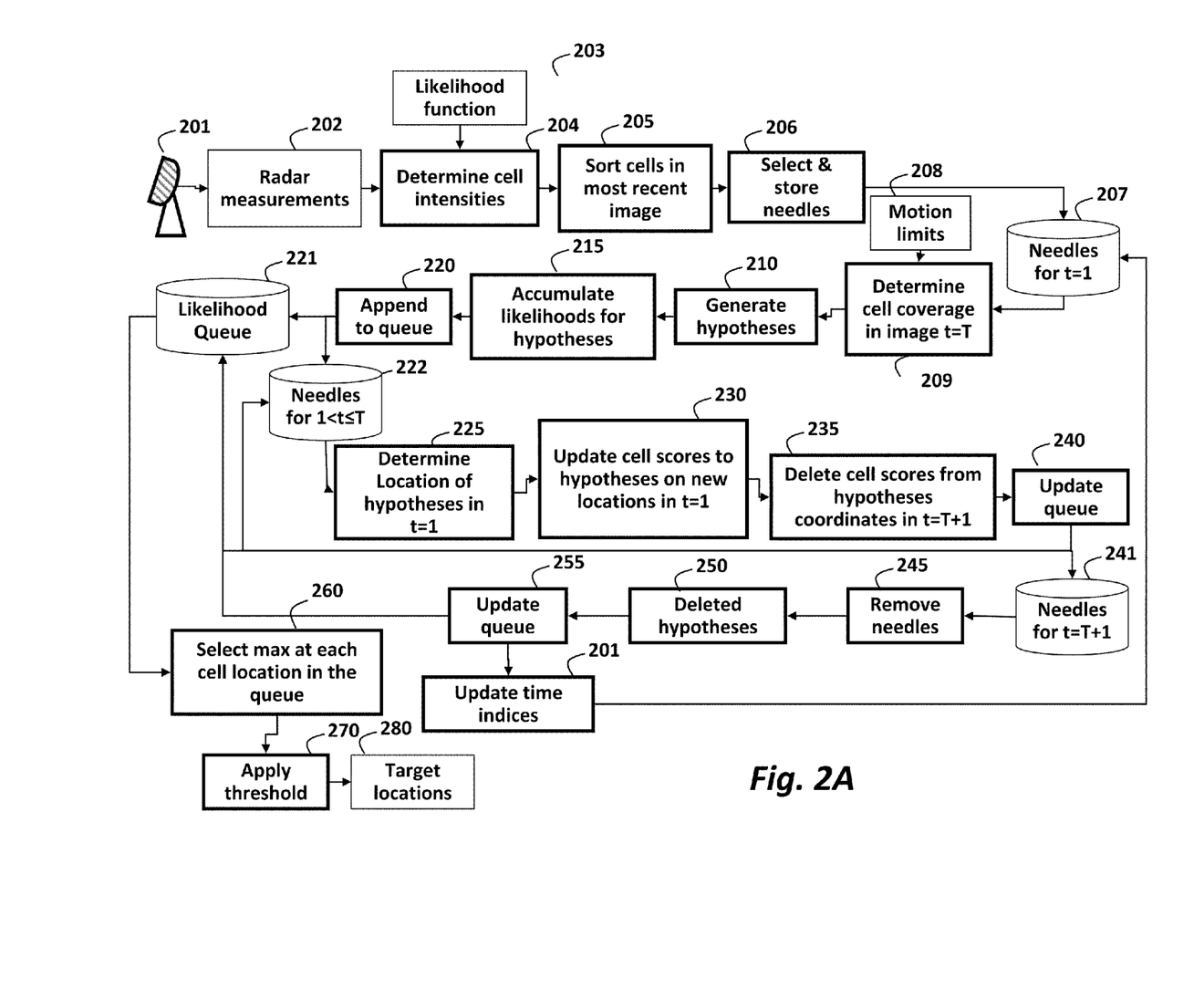
FIGS. 2A-2B are a detailed and simplified flow diagrams of the method for detecting targets according to embodiments of the invention.
Figure 2B:
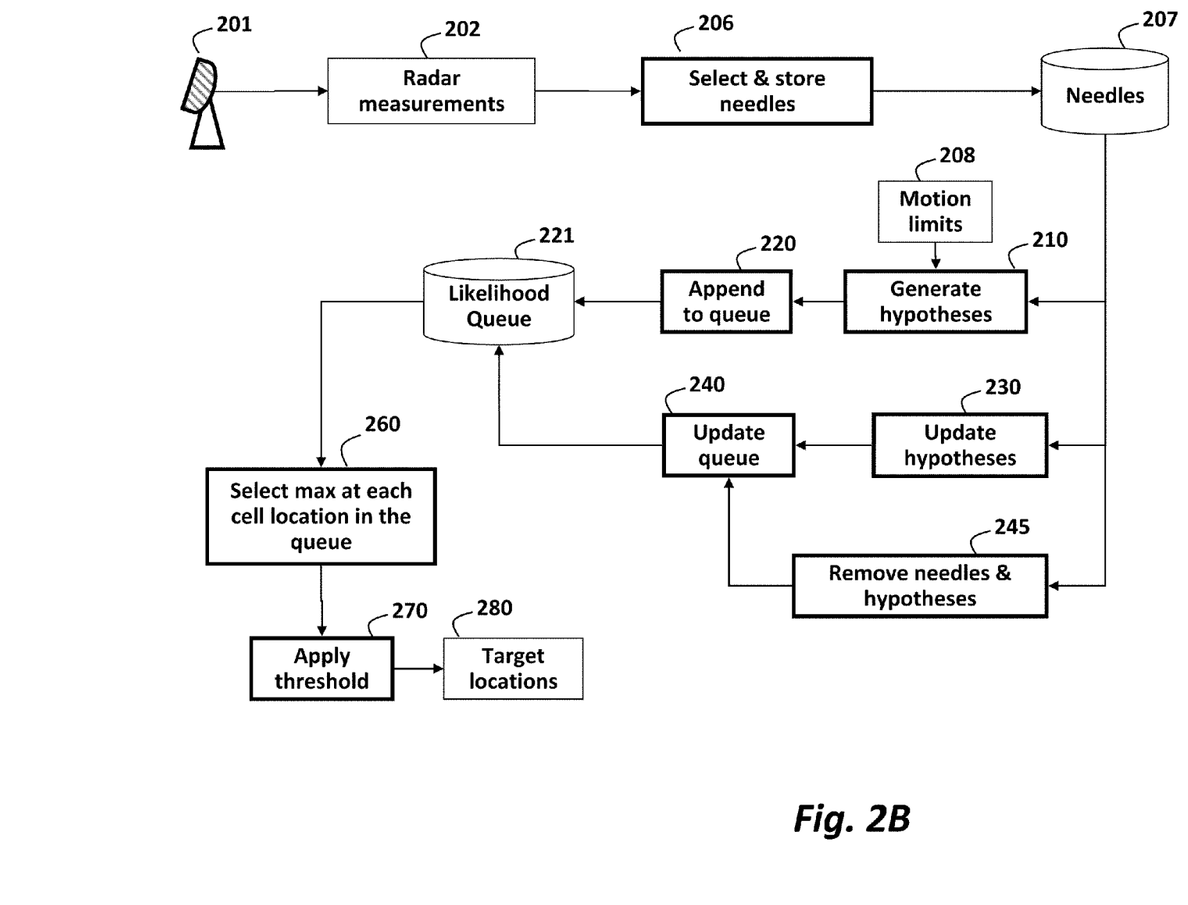

As shown in FIGS. 2A and 2B, the embodiments of the invention provide a method for detecting small targets from a sequence of radar images using sample based track-before-detection (TBD). The steps of the method can be performed in a processor connected to memory and input/output interfaces as known in the art.

A radar system 201 acquires radar measurements 202 in a form of a temporal sequence of images. At time t, an input image $I_t$ for the method includes noise $n_t$, clutter $c_t$, and a target signal $z_t$ $$I_t = z_t + n_t + c_t, \quad (1)$$

where clutter refers to signals returned from background objects such as ground, sea, atmospheric conditions, including rain, snow, hail, sand storms, clouds, and turbulence, and man-made objects such as buildings, etc. These constituents are assumed to be independent random variables. Noise is typically present in the communication channel, and appears as random variations superimposed on the received signal.

A state of the target at time t is $S_t$ $$s_t = [x_t, \dot{x}_t, y_t, \dot{y}_t]', \quad (2)$$

where "˙" indicates the first derivative (velocity), and "'" is a transpose operator, and $S_t$ includes a position and velocity of the target in the input image, and the state transition is modeled by linear state transition is modeled by linear and/or nonlinear parametric motion M, e.g., if linear the model is $$s_t = \begin{bmatrix} M & 0 \\ 0 & M \end{bmatrix} s_{t-1}, \quad M = \begin{bmatrix} 1 & k \\ 0 & 1 \end{bmatrix} \quad (3)$$

between sequential input images, and the time is uniformly sampled at k=1. The state can also consider noise.

This model does not contain the target signal $z_t$ and the corresponding noise process, which is mainly due to the fluctuations (Swerling) of the target, as the formulation does not require its estimation, see U.S. Pat. No. 4,649,390. Each target has an unknown velocity $[\dot{x}_t, \dot{y}_t]'$, which is unknown but, in a range of $[\dot{x}_{max}, \dot{y}_{max}]$.

The number of the images in a temporal window is T, such that $t_1$ corresponds to the most recent image and $I_T$ to the earliest image in the window. Each image is partitioned into a grid of cells, e.g., 1000×10. Each cell corresponds to an intensity (power) of the received signal in a particular spatial location, defined by a range (bins) and an azimuth (beams).

That is, the coordinates of the cells in an image coordinate system correspond to locations in a world coordinate system.

A likelihood function 203 is used to determine 104 scores for the cells in each most recent image. The number of cells along the range and azimuth (beam) axes are $N_r$ and $N_b$, respectively. The total number of cells is $N_n$.

In a streaming mode with a moving temporal window, the method proceeds by sorting 205 the cells $q^1_i:(x_i, y_i)^1$ in the image $I_1$ according to intensities $I_1(q^1_i)$. Note that $I_1(q^1_i) \geq I_1(q^1_{i+1})$.

A subset of $N_n$ cells having the highest intensities selected 206. The selected cells are referred to as "needles" q. The selected needles are stored in a current set of needles 207, $A_1:\{q^1_i | i=1, \ldots, N_n/T\}$.

Motion limits 208 are used to determine 209 the coverage of each cell in each image.

For the selected needles $q^1_i$, all possible hypotheses $H^1_{i,1}, \ldots, H^1_{i,J}$ are generated 210 using, e.g., the state transition model of Eqn. (3), and corresponding maximum limits. This means that a grid $(g_x, g_y)_{i,u,v,T}$ is applied to the earliest image $I_T$ in the window around the coordinates $(x_i, y_i)^1$ of the cell $q^1_i$ to determine the extend of the hypotheses, e.g., the corresponding coverages. For example, the hypotheses correspond to candidate paths of the target passing through the position corresponding to the location of the cell. The grid generates a fixed number J of hypotheses $$(g_x, g_y)_{i,u,v,T} = \left(x_i - u \frac{\dot{x}_{max}}{U} T, y_i - v \frac{\dot{y}_{max}}{V} T\right), \quad (4)$$

where $-U \leq u \leq U$, $-V \leq v \leq V$, and J is the total number of grid locations that have $(\dot{x}_{max}^2 + \dot{y}_{max}^2)^{0.5}$ distance from the center of the grid. U and V are selected to obtain a subcell resolution. In addition, the hypothesis can be a linear and nonlinear function from time domain to image locations. The hypothesis can be generated so that it ends on a sub-cell resolution grid in the most previous image within the temporal window for each current needle. The current needle position can be perturbed within a sub-cell resolution grid, and then the hypotheses are generated for each of these multiple perturbed positions for each current needle.

A hypothesis $H_{ij}: \{q^1_i, \ldots, (g_x, g_y)_{i,u,v,t}, \ldots, (g_x, g_y)_{i,u,v,T}\}$ corresponds to a motion trajectory in the spatio-temporal window passing through the corresponding needle.

The likelihood of each hypothesis $L(H_{i,j})$ is accumulated 215 by traversing backwards in time along the motion trajectory $$L(H_{i,j}) = \sum_{t=1}^{T} (g_x, g_y)_{i,u,v,t}.$$

The accumulated likelihoods are either the underlying cell intensities or their individual likelihood scores obtained from the likelihood ratio in case the distribution parameters are known.

The likelihoods are appended 220 to a queue 221 of likelihoods $Q_l$ of the corresponding location of the cell in the image $I_1$. That is there is one queue for each location. The queue stores the hypotheses reaching to that cell position and their likelihoods. Because the appended hypotheses are already in the same image, their location are $l = q^1_i$. The appending operation is only done for the cell locations at the current image $I_1$ because the final detection is evaluated in this image. In other words, $I_1$ is the final detection image.

For the needles $q^t_i$ 222 in the previous sets $A_t$, $1 \leq t\_T$, the location forward motion on the corresponding hypotheses is determined 225, and the hypotheses are updated 230 with the corresponding likelihoods. Due to this update, the final appending locations/can change. Therefore, such hypotheses are reassigned to the correct queues.

While updating 240 the existing hypotheses, the contribution of the needles that are not in the current temporal window are subtracted from the queue, i.e., the cells in $I_{T+1}$ along the trajectory. The needles of the $I_T+1$ are deleted 245 from the current queue 241, and the corresponding hypotheses are also deleted 250 by updating 255 so that the queue always retains a constant number of needles in the queue, and time indices are updated 255.

The maximum likelihood for each needle location in the queue is selected to determine 260 the queue of likelihoods $Q_l$, which indicates the target existence in the image $I_1$ by applying a threshold 270 to detect the locations of the targets 280. The threshold is set such that the detection performance achieves a specified false alarm rate.

In a batch mode, all $N_n$ cells for the entire temporal window are selected at the same time, either by sorting all 205 cells and selecting cells 206 with the highest intensities, or sorting cells within each image as described above. Alternatively, the selecting can use a threshold intensity.

All hypotheses are generated at the same time, and the likelihoods and queues are constructed accordingly. In general, a target cannot exactly coincide to the underlying integer indexed cell locations on the uniformly quantized imaging grid because of the mapping from world to imaging coordinates. For instance, a target at coordinates (4.49, 3.51) will appear at the cell at coordinates (4, 4) due to quantization.

Because all hypotheses pass through the integer valued cell locations in the above selecting step, there is a chance that some hypotheses contain inaccurate cells along their trajectories. This can become observable for extremely low false alarm rates and very large temporal window sizes. To prevent this, multiple cells are assigned at subcell proximity to the selected cell, instead of assigning a single cell.

Number of Cells

Figure 3A:
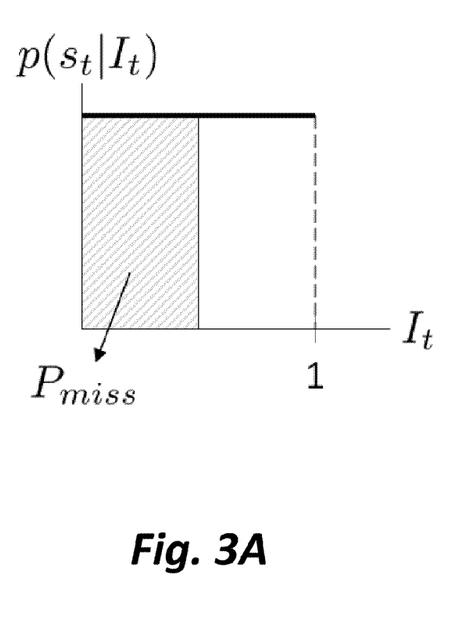
FIGS. 3A-3C are graphs of probabilities of target existence for given measurement intensities and different correlations.
Figure 3B:
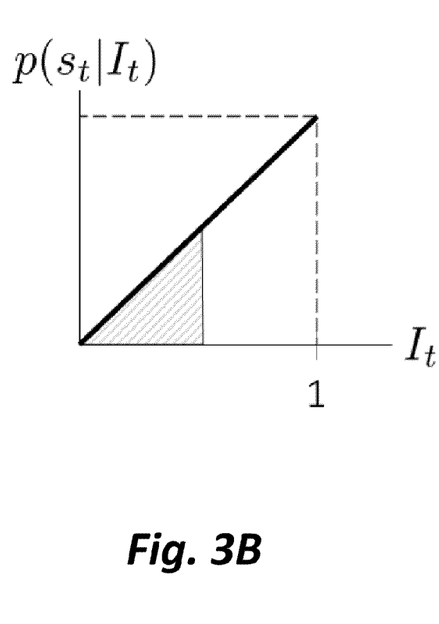
Figure 3C:
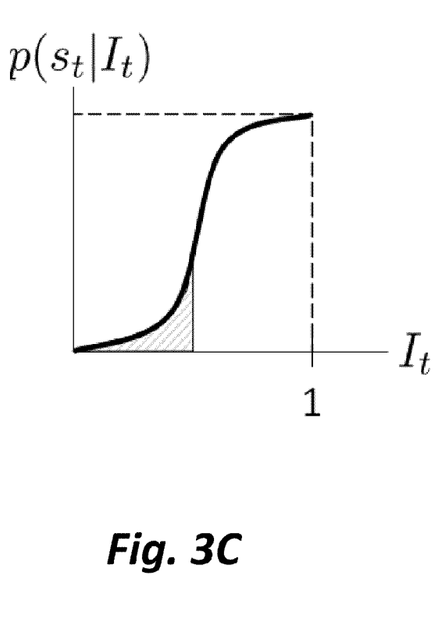

The probability of target existence, given the measurement intensity, can have different correlation as shown in FIGS. 3A-3C. In FIG. 3S, the target is not correlated with the intensity. In FIG. 3B the target is linearly correlated, and FIG. 3C shows higher intensities that are much more likely to represent a target.

If the cell intensities $I_t$ are not correlated with the probability of being a target, then the conditional probability function of target existence given the cell intensity is uniformly distributed imposing all intensities to have the same probability. If there is no direct relation between the observed cell intensities and target probability as shown in FIG. 3A, then one can only select cells randomly at the current frame, hoping one contains the target, and generate hypotheses based on those selections. In this case, an expected true detection rate for the N images is $$P_{td}^T = 1 - \prod_{t=1}^{T} P_{miss}^1 = 1 - \left(1 - \frac{N_n}{N_b N_r}\right)^T, \quad (5)$$

where $P^1_{miss}$ is the probability of a miss at a single image. For instance, to obtain an expected true detection rate 0.5 for the $N_r=1000$, $N_b=100$, and $T=10$, the number of cells that need to be selected at each image is $N_n=6697$.

The target signal is additive to the noise and clutter. Thus, the larger the intensity of a cell, the more likely the target is at that location. For the scenario where the intensity is linearly correlated with the probability of being target, the probability of a miss at a single image is $$P^1_{miss} = \left(1 - \frac{N_n}{N_b N_r}\right)^2. \quad (6)$$

When selecting the cells with the highest intensities, one needs $N_n=3406$ cells, i.e., 3% of all cells in the image, at each image to achieve the same $P^T$ td above. Yet, the correlation is much stronger in actual systems resembling Heaviside function $$0.5 + \pi^{-1} \arctan(\beta[I_t - I_\alpha]),$$

where the equilibrium point $I_\alpha$ is defined by the likelihood functions $L(h_0|I_\alpha) = L(h_1|\alpha)$, and $\beta \approx 0.01$. As an example, using the likelihood computation in the following section, only $N_n=70$ cells (0.07% of all cells in the image are needed, which is a reduction of about two orders of magnitude.

Likelihood Ratio Determination

The method does not require signal distributions to be known or use a likelihood ratio. Still, certain systems assume noise $n_t$ to be a Rayleigh distribution as the noise corresponds to the Euclidean distance between two orthogonal, normally distributed random variables, and the clutter $c_t$ to be a Weibull random variable.

The likelihood ratio is the ratio of the null and target existence hypotheses functions. The null hypothesis $h_0$ represents the probability that no target is in a given cell. This can be modeled as the distribution of the sum of Rayleigh and Weibull random variables corresponding to the clutter and channel noise $$p(h_0):p(c+n), \quad (7)$$

where random variables $c_t$ and $n_t$ maintain their distribution properties between the measurements. Thus, the t index is not used, and clutter, of course, can change over time.

Given two independent random variables c and n with corresponding densities $p(c)$ and $p(n)$, the probability distribution density for the random variable $r=c+n$ is defined as the convolution operator $$p(r)=p(n)*p(c). \quad (8)$$

However, the noise and clutter distribution parameters are not known, and the convolution operator cannot be applied directly. It is possible to approximate this summed distribution for a relatively large amount of data, e.g., (1000×100 cells), where possible targets can have only insignificant statistical contribution. Hence, an arbitrary shape envelope can be fit to the measurements exploiting the strong law of large numbers by kernel density estimation in terms of Gaussian kernels $$p(r) = \frac{1}{K\sigma}\sum_{k=1}^{K}\psi\left(\frac{r-r_k}{\sigma}\right), \psi\left(\frac{r-r_k}{\sigma}\right) = \frac{1}{\sqrt{2\pi}}e^{-\frac{(r-r_k)^2}{2\sigma^2}}, \quad (9)$$

where $\psi$ is a zero mean Gaussian kernel, and K is the total number of kernels used. This type of kernel fitting, in general, can model any nonlinear distributions.

The second hypothesis $h_1$ corresponds to the probability of observing a target $$p(h_i):p(s+c+n)=p(s+h_0), \quad (10)$$

which corresponds to the distribution of sum of two Rayleigh and one Weibull random variables, in case the target random variable is Rayleigh distributed.

After the distribution function of the null hypothesis is obtained, it is numerically convoluted with the target density function where the value of this parameter comes from the working operating point. After both distributions of the null and target hypotheses are estimated, a log likelihood decision rule is applied to determine the likelihood ration for a cell.

Figure 4:
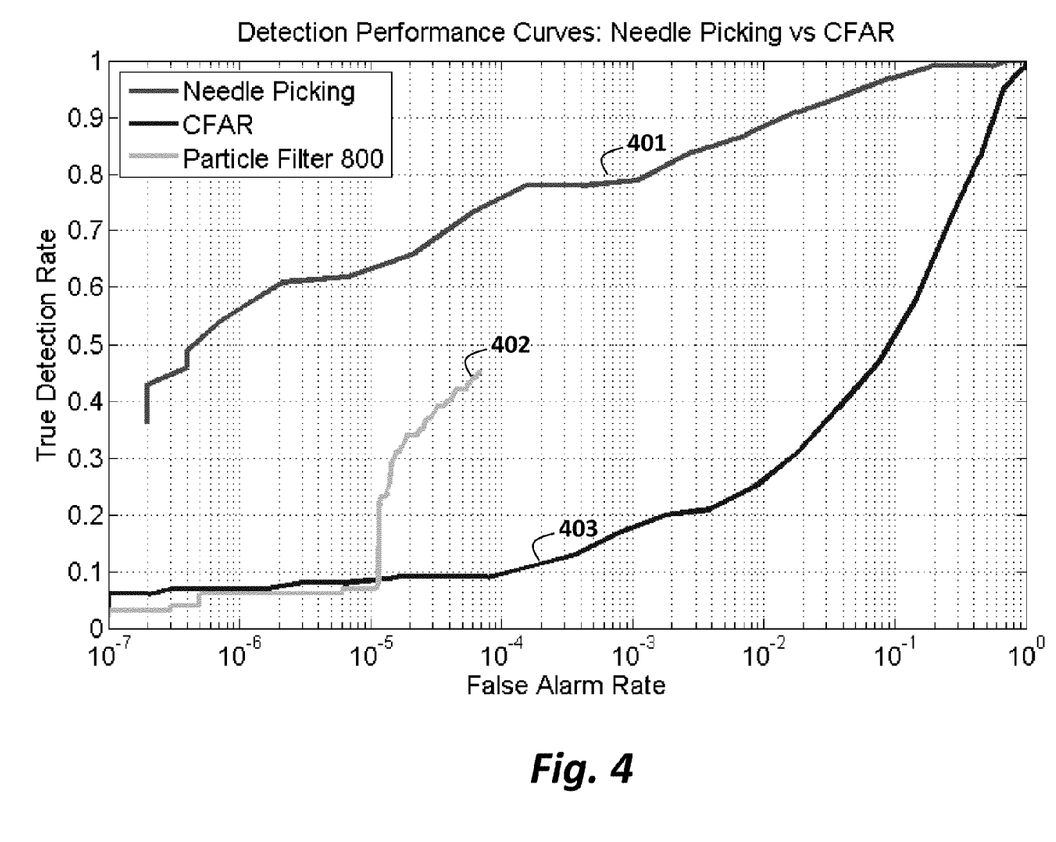
FIG. 4 is a graph comparing performance of needle picking according to embodiments of the invention with the prior particle filters.

FIG. 4 compares the performance graphs of the needle picking 401 according to embodiments of the invention with the prior particle filters 402 and CFAR 403 when there is a single target in the measurements. The needle picking achieves 55% detection rate at $10^{-6}$ false alarm rate, while the adaptive CFAR can only provide 8%. The particle filter has many parameters to fine tune. Its performance deteriorates for the low false alarm rates by constructing false trajectories in very low SNR measurements.

Figure 5:
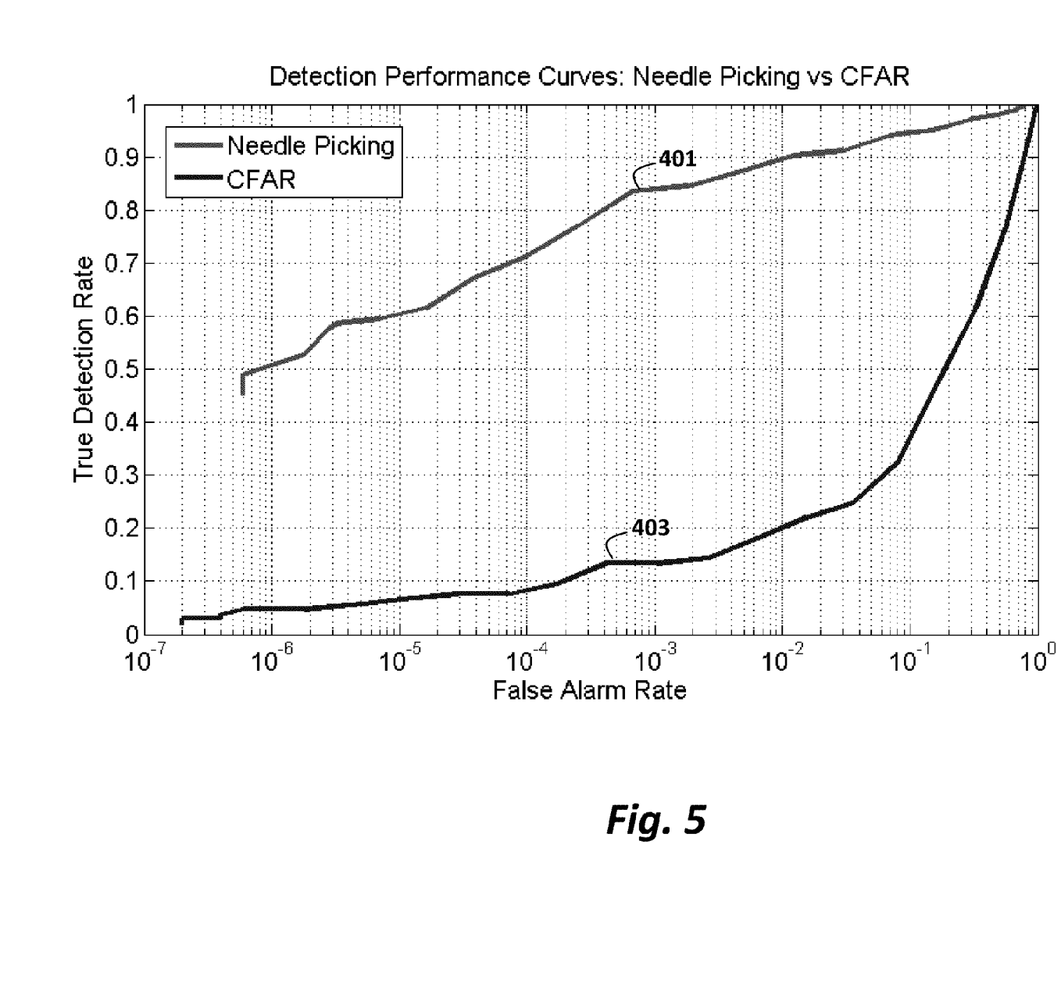
FIG. 5 is a graph comparing performance for multiple targets.

FIG. 5 compares the performance for the multiple targets. The performance can be higher for vertical (on range) and horizontal (on beam) target motions. Because the hypotheses are accumulated along the candidate trajectories, the candidate hypotheses do not change the trajectory points when the motion is vertical or horizontal regardless of the velocity.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for detecting a target in a sequence of radar images, wherein each image is partitioned into a. grid of cells, and wherein each cell has a. corresponding position in an image coordinate system associated with a location in a world coordinate system, comprising:

determining, for each most recent image in a sliding temporal window of the sequence of images, intensities of each cell, wherein each cell has the corresponding position in the image coordinate system associated with the location in a world coordinate system;

storing a subset of the cells having highest intensities as a set of current needles, wherein each needle in the current set of needles has the corresponding position in the image coordinate system associated with the location in the world coordinate system;

determining a set of hypotheses, obtained by using a state transition model and corresponding maximum limits, for the current set of needles, wherein each hypotheses for each needle in the current set of needles has the corresponding position in the image coordinate system associated with the location in the world coordinate system;

appending the current set of hypotheses, to a set of queues, wherein there is one queue for each corresponding cell position in the final image, wherein the corresponding position is each cell in the final image is associated with the location in the world coordinate system;

updating hypotheses for the previous sets of needles to the corresponding set of queues; and selecting a maximum likelihood in the set of queues to detect the location of targets, wherein the current position associated with the queue with the maximum likelihood corresponds to the locations of the targets in the world coordinate system, wherein the steps are performed in a processor.

2. The method of claim wherein each image $I_t$ includes noise $N_t$, clutter $C_t$, and a target signal $Z_t$ according to $$I_t: z_t + n_t + c_t.$$

3. The method of claim 1, wherein a state of the target at time t is $S_t$ $$s_t = [x_t, \dot{x}_t, y_t, \dot{y}_t]',$$

where "˙" indicates a first derivative (velocity), and "'" indicates a transpose operator, and $s_t$, includes a position and velocity of the target in the image, and the state transition is modeled by linear motion M $$s_t = \begin{bmatrix} M & 0 \\ 0 & M \end{bmatrix} s_{t-1}, \quad M = \begin{bmatrix} 1 & k \\ 0 & 1 \end{bmatrix}$$

between sequential images, and the time is uniformly sampled at k=1.

4. The method of claim I, wherein a state is of the target at time t is $S_t$ $$s_t = [x_t, \dot{x}_t, y_t, \dot{y}_t]' + f\text{noise}.$$

5. The method of claim 1, wherein a state transition is modeled by linear and nonlinear parametric motion.

6. The method of claim 1. wherein a hypothesis is a. candidate path of the target passing through the position corresponding to the location of the current needle.

7. The method of claim 1, wherein a hypothesis is a linear and nonlinear function from time domain to image locations.

8. The method of claim 1, wherein each location has an associated range and azimuth.

9. The method of claim 1 further comprising:
using motion limits to determine a coverage of each cell in each image.

10. The method of claim 1, wherein a size of the target is equal to or less than a size of the cell.

11. The method of claim 1, wherein each intensity is determined according to a likelihood, and likelihood of each hypothesis is accumulated by traversing forward and backwards in time along a motion trajectory by aggregating the cell likelihood scores.

12. The method of claim 1, further comprising:
subtracting contributions of needles that are not in a current temporal window of sequence of images from the queues.

13. The method of claim further comprising:
removing hypotheses that are not generated for the needles in a current temporal window of sequence of images from the queues.

14. The method of claim 1, further comprising: storing a subset of the cells having intensities higher than a threshold as a set of current needles.

15. The method of claim 1, further comprising: generating hypotheses ending on a sub-cell resolution grid in the most previous image within the temporal window for each current needle.

16. The method of claim 1, further comprising:
perturbing the current needle position within a sub-cell resolution grid and generating hypotheses for each of these multiple perturbed positions for each current needle.

17. A method for detecting a target in a sequence of radar images, wherein each image is partitioned into a grid of cells., and wherein each cell has a corresponding position in an image coordinate system associated with a location in a world coordinate system, comprising:
determining, for the sequence of images, intensities of each cell;
storing a subset of the cells having intensities higher than a predetermined threshold as a set of needles:
determining a set of hypotheses, obtained by using a state transition model and corresponding maximum limits, for the set of needles;
appending the set of hypotheses, to a set of queues, wherein there is one queue for each corresponding cell position in a final detection image; and
selecting a maximum likelihood in the set of queues to detect the location of targets corresponding to the positions associated with the queues.

* * * * *